United States Patent [19]
Lulay et al.

[11] Patent Number: 6,037,683
[45] Date of Patent: Mar. 14, 2000

[54] GAS-COOLED TURBOGENERATOR

[75] Inventors: Dieter Lulay, Ladenburg; Yvonne Riedling, Hockenheim, both of Germany

[73] Assignee: ABB Patent GmbH, Mannheim, Germany

[21] Appl. No.: 09/195,486

[22] Filed: Nov. 18, 1998

[30] Foreign Application Priority Data

Nov. 18, 1997 [DE] Germany ............................ 197 51 055

[51] Int. Cl.⁷ .................................................. H02K 3/18
[52] U.S. Cl. ................................. 310/52; 310/51; 310/52; 310/89; 310/90; 310/54; 310/58; 310/215; 310/64; 174/110 K; 174/187
[58] Field of Search .................... 310/51, 52, 89, 310/90, 54, 58, 215, 64; 174/110 R, 187

[56] References Cited

U.S. PATENT DOCUMENTS

| | | | |
|---|---|---|---|
| 5,019,737 | 5/1991 | Bruno | 310/89 |
| 5,074,672 | 12/1991 | Emery et al. | 374/147 |
| 5,084,641 | 1/1992 | Saima et al. | 310/51 |
| 5,271,248 | 12/1993 | Crowe | 62/505 |
| 5,331,819 | 7/1994 | Matsuda et al. | 62/51.1 |
| 5,548,168 | 8/1996 | Laskaris et al. | 310/52 |
| 5,672,921 | 9/1997 | Herd et al. | 310/52 |
| 5,866,959 | 2/1999 | Le Flem | 310/51 |
| 5,883,448 | 3/1999 | Zimmerman | 310/52 |

FOREIGN PATENT DOCUMENTS

| | | |
|---|---|---|
| 757 987 | 10/1944 | Germany . |
| 896 086 | 10/1953 | Germany . |
| 1 178 505 | 12/1971 | Germany . |
| 37 03 594 A1 | 9/1988 | Germany . |
| 40 32 944 A1 | 6/1991 | Germany . |
| 43 32 304 A1 | 2/1995 | Germany . |

OTHER PUBLICATIONS

Utility model application (Wölfer), dated Jun. 18, 1964, electrical machine with circuit cooling.

E. Eisenschmidt: "Konstruktive Grundsätze für Turbogeneratoren bei Luft–und Wasserstoffkühlung", Energietechnik, 9. Jg., Heft 11, Nov. 1959, pp. 504–510, constructive principles for turbo generators with air or hydrogen cooling.

Primary Examiner—Nestor Ramirez
Assistant Examiner—Thanh Lam
Attorney, Agent, or Firm—Herbert L. Lerner; Laurence A. Greenberg; Werner H. Stemer

[57] ABSTRACT

A gas-cooled turbo-generator has a pressure-tight casing with a stator disposed therein and a rotor. The turbo-generator also has cooling air feeders and dischargers disposed in the casing for circulating cooling air at a super atmospheric pressure in the casing. The stator and rotor have longitudinal slots for accommodating conductors and a proportion of conductor volume per longitudinal slot is at least twice a volume of the insulation. There is also provided an air/water heat exchanger for absorbing heat from the cooling air.

5 Claims, 1 Drawing Sheet

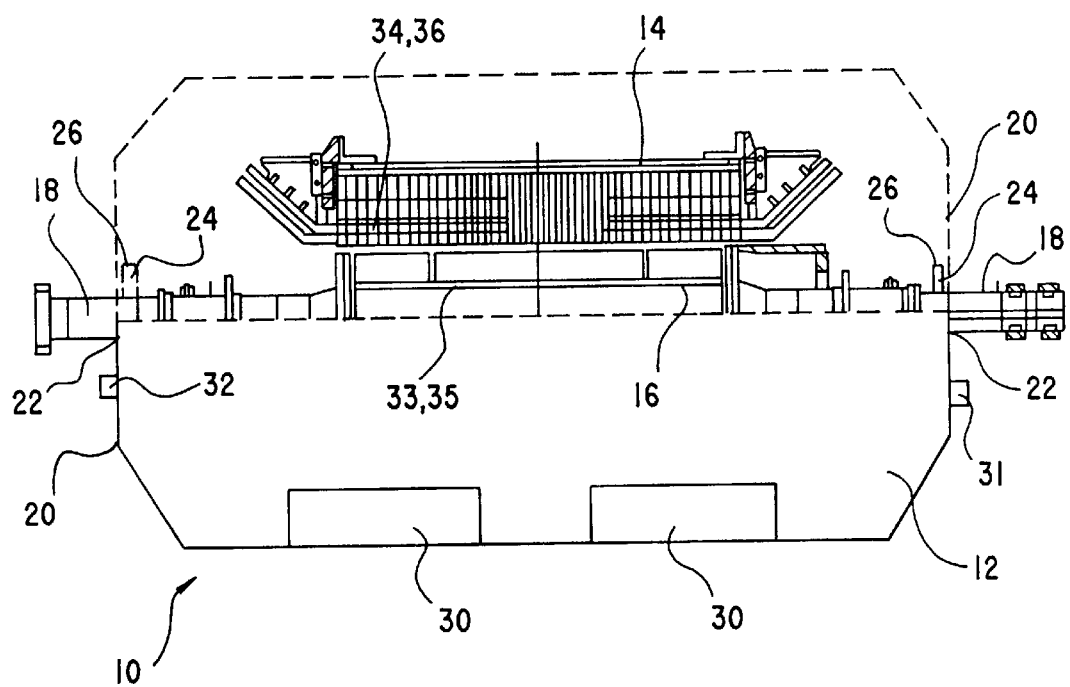

GAS-COOLED TURBOGENERATOR

BACKGROUND OF THE INVENTION

FIELD OF THE INVENTION

The invention relates to a gas-cooled turbogenerator having a pressure-tight casing with a stator disposed therein and a rotor. Feed and discharge devices for providing a cooling gas are also disposed in the casing along with cooling devices for the cooling gas. The stator and rotor have longitudinal slots for accommodating copper conductor bars surrounded by insulation. In the prior art, the volumetric ratio of the insulation to conductor bar volume is at least 1.0 for each longitudinal slot.

The term turbogenerator generally refers to synchronous generators, usually three-phase, two-pole, which are driven by a steam or gas turbine. In this case, it is immaterial whether they are intended for high or smaller outputs.

It has generally been known for a long time to dissipate the heat loss in generators with cooling gases. In this case, the cooling gas originally provided was air. Fans for moving the cooling gas are fastened for this purpose usually to the rotor shaft or acted upon by the rotor shaft. The cooling gas flows in at one end face or both end faces of the casing of the turbogenerator and flows through the casing and comes out again at the opposite end face or through corresponding outlet openings.

The great advantage of this type of construction has its roots in the simple construction, which requires no complicated casing for the generator but only an enclosure to deflect the air flow and in addition only a supporting frame for the stator.

In known generators, the enclosure is configured to be split along the longitudinal axis, so that the top part is removable and permits access to the stator. However, air-cooled generators are only intended for low outputs up to a maximum of 300 MVA, since the cooling effect attainable with air is inevitably limited and therefore the requisite cooling is not ensured with air at higher outputs.

For generators having a higher output, the cooling medium used is preferably hydrogen gas (H2), which, compared with air, permits a markedly higher cooling capacity, which can be increased by pressurizing the hydrogen gas and by carrying out the cooling under super atmospheric pressure. However, cooling with hydrogen gas requires an additional, not inconsiderable outlay, which has an effect on the costs both during the procurement and later during operation of the generator. A considerable outlay is necessary for the gas-tight and pressure-tight casing with shaft seals, the auxiliary equipment for drying, cleaning and pressure-regulating the cooling medium, the equipment for purging the casing for example during repairs, and for the auxiliary equipment for the degassing of the sealing medium of the shaft seal and its pressure regulation. This is to be explained below in detail.

The outlay already starts during the construction of the casing for the generator, which casing is not constructed merely as a thin-walled air-directing hood, as in the case of air-cooled generators, but is constructed to be pressure-tight. This is necessary because the casing has to permanently withstand a certain internal super atmospheric pressure relative to the ambient pressure and therefore has to undergo an internal-pressure test at a maximum pressure of 1,000,000 MPa in order to thus ensure its safety against bursting.

Provided in the interior space of the casing is a gas guide, which accordingly deflects the hydrogen-gas flow in such a way that the cooling-gas flow sweeps over the heat-emitting winding regions and the laminated body as uniformly as possible and absorbs heat in the process. Furthermore, the internal guide ensures that the hydrogen-gas flow, after absorbing the heat loss of the generator, reaches a cooler. The cooler is provided for the hydrogen-gas flow and preferably has a secondary feed of water and in which the hydrogen gas gives off the absorbed heat before it is fed again to the winding for a further cooling cycle.

A further problem associated with the generator having hydrogen gas cooling is the virtually unavoidable losses of hydrogen gas, mainly as a result of leakages at the leadthrough of the rotor shaft through the casing of the generator. In order to prevent these losses or at least keep them low, the shaft leadthroughs are each provided with a shaft seal that is configured as an oil-bath seal.

In this case, the sealing oil is constantly pressurized by a specially provided pressure-regulating device in order to balance the gas pressure of the hydrogen gas. Also required is a degassing device, which degasses the sealing oil at regular intervals or continuously.

In addition, a drying device for the hydrogen gas is provided, which ensures the dryness of the H2.

Finally, in the event of any necessary reconditioning or repair, if the pressure casing has to be opened, it is necessary to first of all remove the hydrogen gas from the casing without oxygen being added and forming an explosive oxyhydrogen gas. For this purpose, the generator casing is purged with nitrogen gas or carbon dioxide.

From all this, it is found that the technical advantage which favors the use of hydrogen gas as the cooling medium must be carefully considered, since the extra outlay resulting from this compared with the generators cooled only with air cannot be overlooked.

No measures of this type are required in the case of the air-cooled generators, so the outlay associated therewith is markedly lower. However, as already mentioned, the attainable cooling capacity and thus the attainable generator output are also markedly lower than in the high-output generators having hydrogen-gas cooling.

A considerable number of hydrogen-gas-cooled generators of an older type of construction are now due for reconditioning, the operating cost of which is comparatively high in relation to generators of a newer type of construction and should be reduced if possible.

SUMMARY OF THE INVENTION

It is accordingly an object of the invention to provide a gas-cooled turbo-generator which overcomes the above-mentioned disadvantages of the prior art devices of this general type, which has a comparatively low outlay for cooling and permits as high a power output as possible during generator operation. In particular, this is to be applied in the course of the reconditioning of older generators having a greater number of operating hours.

With the foregoing and other objects in view there is provided, in accordance with the invention, a gas-cooled turbogenerator, including: a pressure-tight casing; a stator disposed in the pressure-tight casing; a rotor mounted in the pressure-tight casing, the stator and the rotor having longitudinal slots accommodating conductors surrounded by insulation, a proportion of a volume of each of the conductors per longitudinal slot is at least twice a volume of the insulation; cooling air feeders and dischargers disposed in the pressure-tight casing for allowing cooling air at a super atmospheric pressure in the pressure-tight casing; and air/water heat exchangers disposed in the pressure-tight casing for absorbing heat from the cooling air.

According to the invention, therefore, provision is made for compressed air to be provided as the cooling gas, and the compressed air circulates in the generator casing and gives off absorbed heat in a water cooler provided as a cooling device. This measure leads to an increase in the cooling capacity, since the air is under a super atmospheric pressure and has a higher thermal capacity than air at ambient pressure. Therefore, the cooling air can absorb and dissipate more heat than in the case of the hitherto conventional cooling configurations in generators having cooling-air flows circulating under ambient pressure.

Furthermore, in order to utilize the possibilities of the higher cooling capacity with regard to the likewise intended increase in the generator output, provision is made for the active conductor volume in each longitudinal slot to be greater than the volume of the allocated insulation and to preferably be at least twice the volume of the allocated insulation.

The novel cooling concept is intended in particular for older generators which were originally equipped with a hydrogen-gas cooling device and are now to be updated in the course of reconditioning by suitable retrofit measures with the least possible outlay and the outputs of which are possibly also to be increased at the same time.

In this case, according to the invention, the conductor cross sections in the conductor slots have been enlarged, provision being made for adequate cooling. The enlargement of the conductor cross sections is possible with comparatively little outlay, since in older generators the conductors in the conductor slots were surrounded by more voluminous insulation than is necessary with the insulating materials customary today.

According to the invention, this is utilized to the effect that the volume gain, which is made possible by the use of improved (thinner) insulating materials on the one hand and by the improved cooling provided according to the invention on the other hand, serves to install larger conductor cross sections, so that an increase in output results.

With the measures described above, the effect is achieved according to the invention in that the generator formerly cooled with hydrogen gas, despite the use of air as cooling medium, now delivers a higher output than before with hydrogen-gas cooling, or at least delivers the same output as before at markedly reduced operating costs.

The improved cooling referred to, that is, the cooling by air instead of hydrogen gas, is made possible owing to the fact that the casing, unlike in the generators intended previously for air cooling, is configured as a one-piece welded pressure vessel. The end faces of which are provided with covers that form a gas-tight closure and through which in each case the shaft ends of the rotor pass. Since the manufacture of the generator casing is preferably dispensed with during the subsequent updating, the extra outlay associated with this is also dispensed with, so that the compressed-air cooling, which was hitherto unconventional in generators, becomes possible.

In order to nonetheless maintain the pressure required for increasing the cooling capacity of the compressed air, in a further refinement of the invention the end covers are each provided with an air-fed shaft seal instead of the hitherto conventional, very complicated oil-bath seal.

For this purpose, each shaft seal advantageously has an air chamber to which compressed air is admitted and which thus prevents the escape of larger quantities of cooling air at the shaft gap. In this case, some of the compressed air fed into the casing is branched off and fed on the outside of the air chamber in order to thus achieve the shaft seal. The air losses that occur in the process are negligible on the one hand and completely harmless on the other hand.

In addition, in order to reduce the outlay required for the updating of the generator even further, provision is made in a further embodiment of the invention not to carry out an expensive reconditioning of the old rotor to be restored, which was intended for operation with hydrogen-gas cooling, but to replace it with a virtually off-the-shelf and thus substantially more favorable standard rotor, matched to the inside diameter of the stator, for air cooling.

This and further advantageous refinements and improvements of the invention are the subject matter of the subclaims.

Other features which are considered as characteristic for the invention are set forth in the appended claims.

Although the invention is illustrated and described herein as embodied in a gas-cooled turbogenerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, partial longitudinal sectional view of a generator according to the invention.

DESCRIPTION OF THE PREFERRED EMBODIMENT

Referring now to the single FIGURE of the drawing in detail, there is shown a generator 10 according to the invention having a schematically shown pressure-tight casing 12 with a stator 14 and a rotor 16 disposed therein shown in partial longitudinal section. Half of the casing 12 is cut away along the longitudinal axis so that both the stator 14 and the rotor 16 can be seen.

The stator 14 is configured in a conventional manner, as is the rotor 16, which is rotatably disposed therein and whose shaft ends 18 pass through the casing 12 in each case at end faces 20 in shaft leadthroughs or covers 22.

The generator 10, as a machine originally constructed for cooling with a hydrogen-gas cooling device, is provided with the pressure-tight casing 12, which withstands an internal pressure of at least 1,000,000 MPa. In this case, however, unlike the original cooling medium, it is not hydrogen gas but air under pressure that is provided.

Accordingly, shaft seals 24, which are each formed by a shaft-sealing ring (not shown here in any more detail), facing the rotor 16, and an air chamber 26 axially adjoining the shaft-sealing ring, are provided in the interior of the casing 12 at the shaft leadthroughs or covers 22. The air chambers 26 are each fed with ambient air under pressure or with cooling air branched off from the cooling-gas flow and thus, with this air as a sealing air, suppresses to the greatest possible extent the leakage of the cooling air which is located in the interior of the casing 12 and is under pressure.

As already mentioned above, ambient air under pressure, in the generator according to the invention, serves as the cooling medium for the stator 14 and the rotor 16. The cooling air is preferably circulated in the interior of the casing 12 by at least one non-illustrated fan impeller disposed on one of the shaft ends 18 of the rotor 16, so that it flows in at a super atmospheric pressure and in the process is admitted to the stator 14, and in particular to the rotor 16.

In addition to or instead of the above-mentioned at least one fan impeller on the rotor shaft 18, a separate compressed-air fan (likewise not shown here), which provides the compressed air required for the cooling, may also be provided.

Serving to cool the cooling air heated by the heat loss absorbed by the rotor 16 or the stator 14, respectively, is at least one air/water heat exchange 30, preferably four air/water heat exchangers, which are preferably disposed in the bottom of the casing 12.

In addition, the stator 14 and rotor 16 have longitudinal slots 33, 34 that accommodate conductors 35, 36 surrounded by insulation. The active conductor volume in each longitudinal slot 33, 34 must be at least twice the volume of the allocated insulation. Cooling air feeders 31 and dischargers 32 are provided in pressure-tight casing allocated for cooling air at a super atmospheric pressure in the pressure-tight casing.

The decisive advantage of the solution provided according to the invention is based on the fact that, with markedly less outlay, the advantage of the compressed-gas cooling as known from generators cooled with hydrogen gas can be utilized without having serious consequent problems with regard to handling or maintenance or in the event of a repair. A complicated shaft seal dependent upon a sealing-oil supply is not required, and costs or procurement problems for leakage compensation do not result either.

In addition, the problem of possible oxyhydrogen-gas formation with the latent risk of an oxyhydrogen-gas explosion, as in the machines cooled with hydrogen gas, also does not exist.

Instead of a rotor produced specifically for hydrogen-gas cooling, a conventional rotor intended for air cooling is used in the invention, although air under a super atmospheric pressure is admitted to the conventional rotor for the cooling. In this way, the advantages of the compressed-gas cooling having a correspondingly increased heat-absorption capacity are combined with a low-cost cooling medium which is available at all times and everywhere and requires no special technical resources and measures.

We claim:

1. A gas-cooled turbogenerator, comprising:
   a pressure-tight casing;
   a stator disposed in said pressure-tight casing;
   a rotor mounted in said pressure-tight casing, said stator and said rotor having longitudinal slots accommodating conductors surrounded by insulation, a proportion of a volume of each of said conductors per longitudinal slot is at least twice a volume of said insulation;
   cooling air feeders and dischargers disposed in said pressure-tight casing for allowing cooling air at a super atmospheric pressure in said pressure-tight casing; and
   air/water heat exchangers disposed in said pressure-tight casing for absorbing heat from the cooling air.

2. The turbogenerator according to claim 1, wherein said pressure-tight casing is a one-piece welded pressure vessel with end faces, said end faces having covers forming a gas-tight closure, and said rotor having shaft ends passing through said end faces.

3. The turbogenerator according to claim 2, wherein said covers each have an air-fed shaft seal.

4. The turbogenerator according to claim 3, wherein each of said air-fed shaft seal has an air chamber receiving compressed air to minimize an escape of the cooling air at a shaft gap.

5. The turbogenerator according to claim 1, wherein said stator has an internal diameter and said rotor is a standard rotor matched to said internal diameter of said stator.

* * * * *